Aug. 15, 1967 — L. M. MARANTO — 3,335,726
LUBRICATING TAMPON
Filed March 8, 1965

Loretta M. Maranto
INVENTOR.

BY *James Harrison Bowen*
ATTORNEY

3,335,726
LUBRICATING TAMPON
Loretta Margaret Maranto, 11486 64th Ave. N., Largo, Fla. 33540
Filed Mar. 8, 1965, Ser. No. 437,929
1 Claim. (Cl. 128—270)

The present invention relates to catamenial absorption devices of the type inserted in the mouth of the vaginal canal, and in particular a tampon having a tubular section, triangular-shaped in cross section around the inner surface of the upper end and having a tear-string attached to a lower inclined wall of the tubular section, upper and lower edges of said inclined lower wall being scored whereby a force pulling by said string upon said lower wall removes the lower wall releasing vaseline, or other lubricant so that grease, oil, or other lubricant may be applied to the inner surface of the vaginal canal obviating chafing or irritation.

The purpose of this invention is to provide a tampon in which rubbing or irritation of the wall of the vaginal canal is eliminated.

Various types of appliances have been provided for applying lubricant, such as vaseline, cold cream, and the like, to the surface of the vaginal canal to obviate irritation. However, it has been found difficult to release the lubricant and apply the same to the wall of the vaginal canal without accidental displacement or spillage and waste of the lubricant.

The object of this invention is, therefore, to provide a catamenial device that supplies lubricant to the wall of the vaginal canal, as it is used, to prevent chafing of said wall.

Another object of the invention is to provide a tampon having a lubricant reservoir therein in which means is provided for releasing the lubricant as the tampon is inserted in the vaginal canal.

Another important object of the invention is to provide a lubricant carrying tampon in which the size of the tampon is not increased.

A further object is to provide means for opening a lubricant storage chamber in a tampon by pulling a string through one end of the tampon.

A still further object is to provide lubricating means in a tampon in which a lubricant may be supplied to the wall of the vaginal canal by operation of the tampon.

And a still further object is to provide self-lubricating tampons which are of simple and economical construction.

Other and further objects and advantages of the present invention will be apparent from the following detailed description, drawing and claims, the scope of the invention not being limited to the illustration of the drawing as the drawing is only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claim.

Other features and advantages of the invention will appear from the following description taken in connection with the drawing, wherein.

Figure 1:
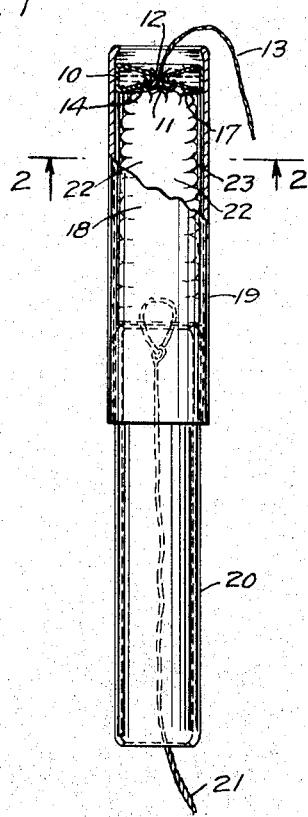
FIGURE 1 is a side elevational view of the lubricating tampon with part broken away showing a tubular lubricant storage chamber in the upper end thereof, and showing a tear-string extended from the lower wall of said storage chamber upwardly through the upper end of the tampon.

While one embodiment of the invention is illustrated in the above-referred-to drawing, it is to be understood that it is merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention it remains obvious that it may be employed in any other capacity wherein it may be found applicable.

In the accompanying drawing, and in the following specification, the same reference characters are used to designate the same parts and elements throughout and in which the numeral 10 indicates a water soluble circular container or tube, triangular shape in cross section having a gathered inner edge 11 around an opening 12 through which a tear-string 13 extends, and with the lower or under surface 14 scored on circles 15 and 16, and the string 13 extended from the lower side 17 of the tubular container and attached thereto between the circles 15 and 16, a pull on the string will tear loose the circular strip or wall between said circles, releasing jelly or a lubricant in the tube or container.

The gathers 18 of the inner edge 11 allow room for the V-shape plastic container to stretch as the tampon is ejected whereby the tampon fits smoothly to the inner periphery of the cylindrical container 19 the outer surface of which is tapered.

The tampon is provided with an inner conventional tube 20 that is withdrawn after use by the string 21, and a pad or body 22 having a tapering outer surface 23 with a small upper end, as shown in FIGURE 1.

Figure 3:
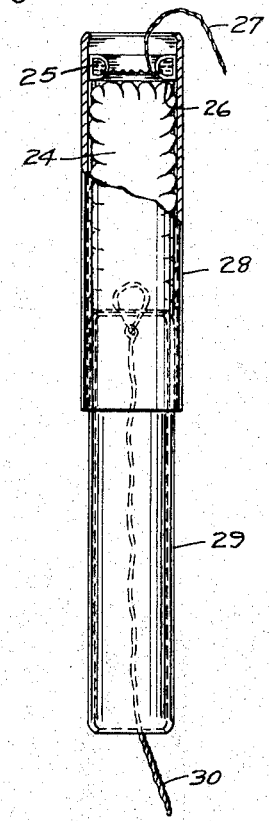
FIGURE 3 is a side elevational view of the lubricating tampon, similar to that shown in FIGURE 1, also with part broken away, showing a modification wherein the lubricant reservoir is indented in the annular side surface of the tampon.
Figure 2:
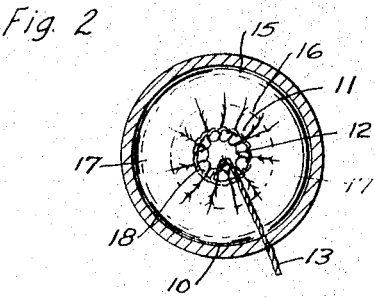
FIGURE 2 is a cross section through the upper part of the tampon taken on line 2—2 of FIGURE 1.
Figure 4:
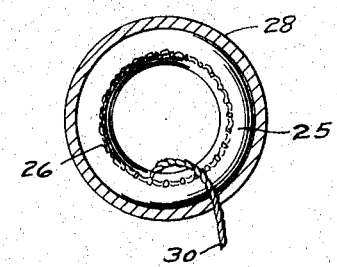
FIGURE 4 is a cross section through the tampon of the design shown in FIGURE 3.

In the design illustrated in FIGURE 3 the inner portion or body 24 of the tampon is provided with an annular recess 25 in which the lubricant or jelly is stored, and after inserting the tampon in the vaginal canal the under portion 26 of the storage chamber 25 is torn away by a string 27 releasing the lubricant or jelly and thereby lubricating the tip of the tampon, which includes an outer tube 28, an inner tube 29, and a string 30.

The container, which is cylindrical in shape, holds the tampon. The container may be made of a suitable plastic, or other material and this may be filled with water soluble sterile jelly, or the like.

The tampon, if compressed close to the leading edge, releases the jelly or lubricant and the larger portion is ejected for use, the outer tube being removed.

From the foregoing description, it is thought to be obvious that a lubricating tampon constructed in accordance with this invention is particularly well adapted for use, by reason of the convenience and facility with which it may be assembled and used, and it will also be obvious that the invention is susceptible of some change and modification without departing from the principles and spirit thereof, and for this reason it is not desired to be limited to the precise arrangement and formation of the several parts herein shown in carrying out the invention in practice, except as claimed.

What is claimed is:

In a tampon, the combination which comprises (a) an outer tube having an open lower end and with an inwardly curled rim on the upper end, (b) an inner tube with inwardly curved rims in both ends,
(c) a string extended through said inner tube and fastened by a loop to the inner end of the tube, said string depending from the lower end of the tube,
(d) a circular tube providing a storage chamber around the inner surface of the upper end of the outer tube,
(e) absorbent padding providing filling for the interior of the tubes, and a string extended from the upper end of the outer tube.

References Cited

UNITED STATES PATENTS

| 1,575,123 | 5/1926 | Martocci-Pisculli | 128—270 |
| 2,102,858 | 12/1937 | Schlumbohm | 206—46 |
| 2,267,030 | 12/1941 | Hill | 128—285 |
| 2,691,982 | 10/1954 | Jones | 128—261 |
| 2,739,593 | 3/1956 | McLaughlin | 128—270 |

ADELE M. EAGER, *Primary Examiner.*